United States Patent [19]

Krisher

[11] Patent Number: 5,162,026
[45] Date of Patent: Nov. 10, 1992

[54] PLANETARY AXLE DRIVE SYSTEM

[75] Inventor: James A. Krisher, Fort Wayne, Ind.

[73] Assignee: Dana Corporation, Toledo, Ohio

[21] Appl. No.: 660,775

[22] Filed: Feb. 25, 1991

[51] Int. Cl.$^5$ .................... F16H 37/08; F16H 1/38
[52] U.S. Cl. .................... 475/248; 475/222;
475/252; 475/300; 180/247
[58] Field of Search ............ 475/220, 222, 225, 227,
475/248, 249, 252, 250, 298, 300; 180/245, 248,
249, 250

[56] References Cited

U.S. PATENT DOCUMENTS

| | | | |
|---|---|---|---|
| 685,503 | 10/1901 | Baker | 475/295 X |
| 832,991 | 10/1906 | Mooers | 475/222 |
| 1,018,535 | 2/1912 | Warner | 475/252 |
| 1,454,578 | 5/1923 | Towler | 475/252 X |
| 1,657,510 | 1/1928 | Leipert | 475/222 |
| 1,760,839 | 5/1930 | Drew | 475/252 |
| 1,937,633 | 12/1933 | Tenberger | 180/358 |
| 2,080,477 | 5/1937 | Higgins et al. | 475/248 X |
| 2,818,128 | 12/1957 | Uhlenhaut et al. | 180/73 |
| 2,819,597 | 1/1958 | Wildhaber | 64/21 |
| 2,863,333 | 12/1958 | Golrick | 475/298 X |
| 2,913,929 | 11/1959 | Anderson | 180/247 X |
| 2,971,595 | 2/1961 | Faberé et al. | 180/247 |
| 3,118,515 | 1/1964 | Kraus et al. | 180/73 |
| 3,504,564 | 4/1970 | Keu | 475/300 |
| 4,043,226 | 8/1977 | Buuck | 180/247 |
| 4,074,591 | 2/1978 | Dick | 475/295 X |
| 4,103,753 | 8/1978 | Holdeman | 475/295 X |
| 4,132,131 | 1/1979 | DeBruyne | 475/248 X |
| 4,244,241 | 1/1981 | Treadwell | 475/222 X |
| 4,271,722 | 6/1981 | Campbell | 180/247 X |
| 4,341,281 | 7/1982 | Nagy | 180/247 |
| 4,625,584 | 12/1986 | Onodera | 180/247 X |
| 4,699,235 | 10/1987 | Anderson | 180/247 |
| 4,774,854 | 10/1988 | Ida | 475/225 |
| 4,781,078 | 11/1988 | Blessing et al. | 475/252 X |
| 5,009,621 | 4/1991 | Bankstahl | 475/248 X |

FOREIGN PATENT DOCUMENTS

| | | | |
|---|---|---|---|
| 556053 | 7/1923 | France | 475/248 |
| 1055069 | 2/1954 | France | 475/225 |
| 1335583 | 7/1963 | France | 475/250 |
| 351841 | 3/1961 | Switzerland | 475/250 |
| 657264 | 9/1951 | United Kingdom | 475/225 |

Primary Examiner—Richard Lorence
Assistant Examiner—Khoi Q. Ta
Attorney, Agent, or Firm—Dykema Gossett

[57] ABSTRACT

A front axle drive assembly is disclosed which requires less lateral distance than known prior art assemblies. The drive is preferably for use in four wheel drive vehicles having an offset differential case. In such systems, the differential case is offset toward one side from the vehicle center line to accommodate the engine at the center line. An axle half on the offset side thus has reduced lateral space. The invention includes the use of a planetary system, requiring relatively little lateral space to split torque toward the two front wheels, thus providing additional lateral space for the axle half on the offset side. A constant velocity universal joint mounted between the planetary drive and the offset side axle half is received within the differential case. The lateral space savings resulting from the use of the planetary system allows the offset side axle half to be longer, providing benefits to the vehicle suspension system. In a further embodiment, a relatively simple disconnect for disconnecting the sun gear from a axle shaft is disclosed for part-time four wheel drive use.

10 Claims, 4 Drawing Sheets

PLANETARY AXLE DRIVE SYSTEM

BACKGROUND OF THE INVENTION

This application in general relates to a planetary drive system for use in a vehicle axle assembly. More particularly, the present invention discloses a planetary drive system which minimizes the amount of lateral space used for transferring drive between drive and driven shafts.

Vehicles often have full or part-time four wheel drive. In such vehicles, a drive transmission is connected to both the front and rear axle assemblies through a differential to drive the axles. Typically, the rear axle is constantly driven, while the front axle is either selectively or constantly driven. In full-time four wheel drives, both axles are constantly driven. The provision of a differential for transmitting drive to the front axle requires space in an area of the vehicle where space is already at a premium. It has been a major goal of vehicle manufacturers over the past several years to minimize the size and space of the vehicle. This premium on space is particularly an issue in the engine compartment, which is adjacent to the area where the front axle differential is typically located.

In a well-known type of vehicle, the engine extends longitudinally along a lateral center axis of the vehicle. The front axle differential case might ideally be placed along the center axis. This presents a problem, however, since it would require additional height for the vehicle in the engine compartment. The engine and differential would both occupy the same lateral and longitudinal space requiring the engine to be stacked vertically above the differential. Thus, prior art vehicles may have offset the differential case to one lateral side of the vehicle center axis such that it lies adjacent to, rather than underneath, the engine. This also lowers the center of gravity for the vehicle, which is another goal of the vehicle designer.

While this solution does result in a reduction of required vertical height in the engine compartment, it presents further problems to the suspension system of the vehicle. Typically, vehicle suspension systems have axle halves extending from each of the wheels to the differential case, and connected to a drive member by a constant velocity universal joint. This allows the axle halves to pivot and move angularly relative to the drive member to accommodate the surface over which the vehicle is being driven. These suspension systems work well, provided the axle half is of a sufficient length that a relatively large movement of the wheel is translated into relatively reduced angle movement in the constant velocity universal joint. That is, the axle half could be envisioned as pivoting about an imaginary point within the constant velocity universal joint. The other end of the axle half adjacent to the vehicle may move a discrete distance with the wheel. The amount of angular movement at the pivot point for a particular discrete movement of the opposite end of the axle half, is reduced proportional to the length of the axle half. The longer the axle half, the smaller the angular movement at the pivot point. In order to increase the life of the joint it is desirable to minimize that angular movement.

Problems arise when this type of suspension is utilized in combination with the offset differential case discussed above. Since the differential case is spaced towards one lateral end of the vehicle, the axle half on that lateral end of the vehicle is allowed a reduced lateral distance to achieve an adequate axle half length.

One prior art solution to this problem was the inclusion of the constant velocity universal joint into the differential case on the lateral side that the differential case was spaced towards, defined here as the offset lateral side. The prior art axle drive that utilized this solution included a bevel gear drive system. While this solution did increase the length of the offset axle half, it is desirable to further increase its length.

Further, in such axle drive systems, it may be desirable to disconnect one of the axle halves from the drive shaft in part-time four wheel drive vehicles. While there have been prior art solutions to this problem, those solutions have involved relatively complex arrangements, and are thus somewhat undesirable.

It is an object of the present invention to disclose a drive system for use with offset differential cases which increases the length of the axle half on the offset side. Further, it is an object of the present invention to disclose a relatively simple disconnect system for disconnecting one of the axle halves from its drive member when the front axle is not being driven.

SUMMARY OF THE INVENTION

The present invention addresses the problem of lengthening the offset axle half. By using a planetary system, the present invention reduces the lateral distance necessary to split torque between the two axle halves. The reduction of the necessary lateral distance allows the lengthening of the offset axle half, thus making the use of an offset differential case practical. It must be understood that the increase of the axle half length by even a small amount provides a substantial benefit. The savings of lateral distance by using the planetary system of the present invention is thus a substantial step over the prior art bevel gear drive.

In a disclosed embodiment of the present invention, a vehicle extends longitudinally between front and rear positions, and laterally between two lateral ends. A front axle differential case is offset towards one lateral end from a center line of the vehicle. A drive shaft which transmits rotation to the front axle assembly is also spaced laterally from the center line, and drives a first member within the differential case. The first member drives a second member, which in turn drives a third member. The second and third members each drive an axle half associated with one of the front wheels. The first, second and third drive members within the differential case are a planetary gear system, with one of the members being a ring gear, one being a planet gear carrier, and the other being a sun gear. The differential case is offset towards a first lateral end of the vehicle, and the axle half on the first lateral end has a constant velocity joint received within the differential case at a position laterally aligned with the drive shaft.

The use of a planetary drive system rather than the prior art bevel gear system reduces the lateral space necessary to transmit drive from a drive member to the two driven members which drive the axle halves. The lateral space savings resulting from the use of the planetary system provides additional length to the axle half on the offset lateral end. The savings of even a small amount of lateral distance allows a corresponding increase in the length of that axle half, which is a valuable benefit.

In a preferred embodiment of the present invention, the first member is a ring gear, which drives planet gears associated with a planet carrier, which drives one axle half. The planet gears drive a sun gear, which drives the other axle half.

In a further preferred embodiment of the present invention, the sun gear is movable relative to the planet gears, such that a drive connection between the sun gear and its axle half is disconnected when front axle drive is not desired in part-time four wheel drive vehicles. In this way, the sun gear free wheels, and the two wheels on the front axle are not connected when they are not being driven.

In a further feature of the present invention, the planet gears includes a compound planet gear set wherein a first set of planet gears mesh with, and are driven by, the ring gear, and each of the first planet gears in turn meshes with and drives a second planet gear which drives the sun gear. The sun gear and the planet carrier are thus rotated in the same direction. The disclosed planetary drive system provides a 50/50 torque split between the two front wheels.

In disclosed embodiments of the present invention, the drive member associated with the offset lateral end may be either the planet carrier or the sun gear. Further, although the invention is disclosed for use with a front axle drive, it is considered within a scope of this invention to utilize this system on a rear axle drive should it be necessary to offset the rear axle differential for any reason.

These and other objects and features of the present invention can be best understood from the following specification and drawings, of which the following is a brief description.

DETAILED DESCRIPTION OF THE PREFERRED EMBODIMENTS

Figure 1:
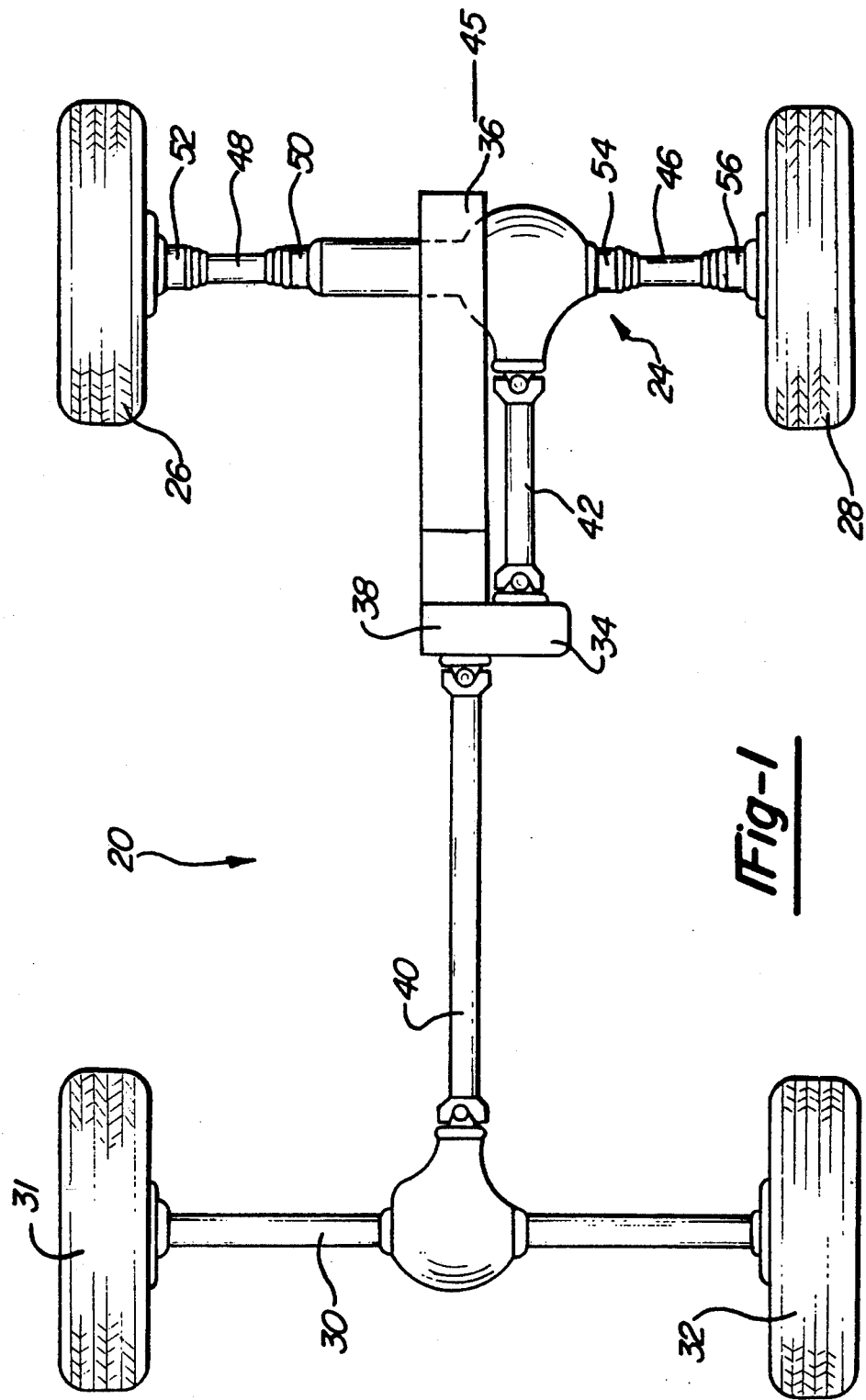
FIG. 1 is a largely schematic layout of a vehicle drive system.

Vehicle 20 includes front axle assembly 24 at a front longitudinal end for driving front wheels 26 and 28, arranged at opposed lateral sides of vehicle 20. Rear axle 30 drives rear wheels 31 and 32. Vehicle 20 has the capability of driving all four wheels 26, 28, 31 and 32. Front wheels 26 and 28 are driven either constantly in a full-time four wheel drive, or selectively in a part-time four wheel drive. Transfer case 34 transmits torque from engine 36 through transmission housing 38, both shown schematically, not to scale, and for location purposes only, to rear drive shaft 40, extending to rear axle assembly 30, and front drive shaft 42, extending to front axle assembly 24 through differential case 44.

Engine 36 extends longitudinally rearwardly along a lateral center line 45 of vehicle 20. Transfer case 44 is spaced laterally offset, and adjacent engine 36, thus reducing vertical space required along center line 45. If differential case 44 were mounted beneath engine 36, additional vertical space would be required. Since differential case 44 is offset towards one lateral end of vehicle 20, engine 36 can be mounted vertically lower. This reduces required height and space and lowers the vehicle center of gravity.

Front axle assembly 24 includes a first axle half 46 extending from differential case 44 to wheel 28 on the offset lateral side, and a second axle half 48 extending to wheel 26 on the opposed lateral side of vehicle 20. Second axle half 48 includes a first constant velocity universal joint 50 at an inner lateral end, and a second outer constant velocity joint 52 connecting shaft 48 to wheel 26.

During drive of vehicle 20, axle shaft 48 moves vertically with wheel 26 along a road surface. This causes the inner end of second axle half 48 to pivot within constant velocity universal joint 50. As discussed above, it is desirable to reduce the amount of pivoting within constant velocity universal joint 50, thus extending the life of the joint. To this end, it is desirable to ensure that axle halves 46 and 48 are of at least a minimum desired length. Since axle half 48 is on the relatively long, opposed lateral end, it is easy to ensure that it is of the minimum length.

The constant velocity joints may be of any known type, and form no part of this invention. Preferably, those currently being used on Dana Corporation assemblies may be utilized.

Axle half 46, however, being on the offset lateral end has less lateral space to achieve its minimum desired length. Thus, constant velocity universal joint 54 is partially incorporated into differential case 44. The structure to this point, is at least somewhat similar to that known in the prior art system which utilized a bevel gear drive in differential case 44. Although the incorporation of constant velocity universal joint 54 within differential case 44 does increase the lateral distance available to lengthen axle half 46, it would be desirable to provide additional lateral distance.

Figure 2:
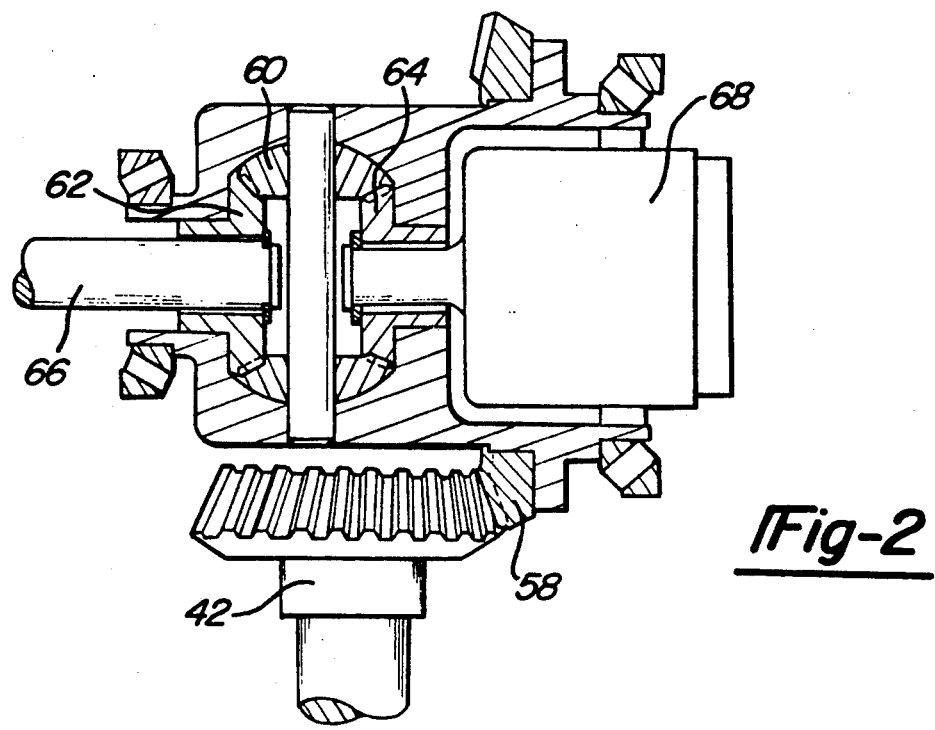
FIG. 2 is a cross-sectional view of a front axle drive similar to that known in the prior art.

FIG. 2 discloses a non-prior art system, which includes a bevel gear drive assembly similar to that utilized in the prior art. Drive shaft 42 drives bevel gear 58, which in turn drives an inner bevel drive 60. Bevel drive 60 drives side gears 62 and 64. Side gear 62 drives shaft 66, which extends to joint 50, on the non-offset lateral end. Side gear 64 drives constant velocity joint 68 on the offset lateral side. While this system provides some additional lateral distance, additional lateral distance is still desired. Further, such a bevel system may not be readily disconnectable for selective drive of the front axle assembly 24.

Figure 3:
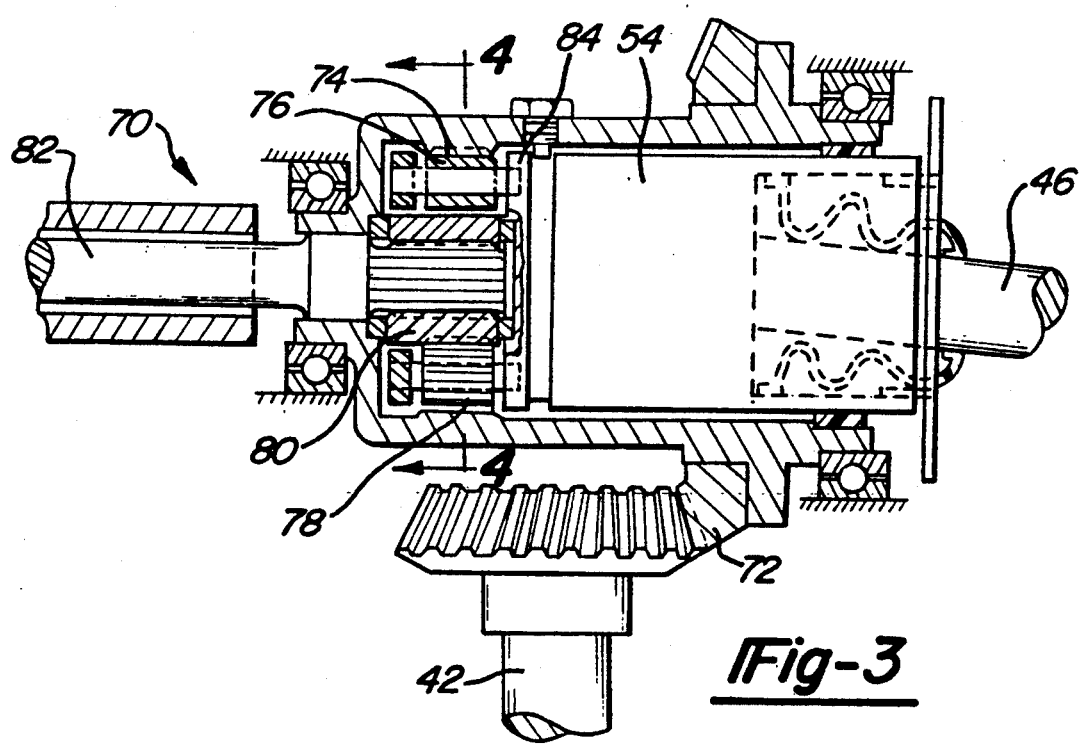
FIG. 3 is a cross-sectional view showing an axle drive according to the present invention.

Drive 70 according to the present invention is illustrated in FIG. 3. Shaft 42 drives gear 72, which rotates inner ring 74 of a planet gear system. Ring gear 74 drives outer planet 76, which meshes and drives inner planet 78, which in turn drives sun gear 80. Sun gear 80 drives shaft 82 associated with a non-offset lateral end. Planet carrier 84 is also rotated, and in turn rotates axle half 46 through constant velocity joint 54.

The use of the planet system 74, 76, 78, 80 and 84 reduces the lateral distance required to split torque between the two lateral ends. As can be seen from FIG. 3, a single lateral axis, or plane, passes through each of the torque transmission members, namely ring gear 74, planet gears 76 and 78, and sun gear 80. This can be compared to the system illustrated in FIG. 2, in which side gears 62 and 64 must be spaced by a minimum lateral distance. The savings of this lateral distance allows the lengthening of offset side axle half 46 to an extent such that the offset differential case 44 may be easily utilized.

Figure 4:
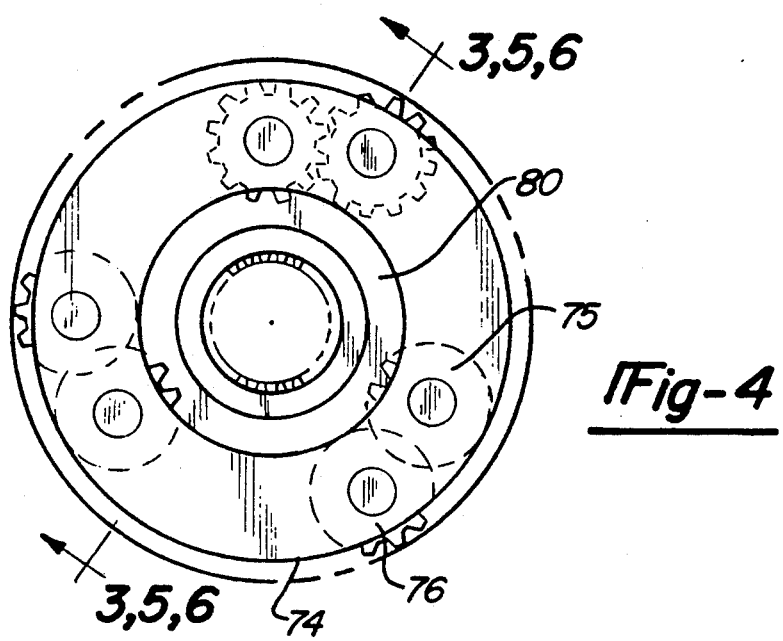
FIG. 4 a cross-sectional view along line 4—4 as illustrated in FIG. 3.

FIG. 4 is a cross-sectional view along line 4—4 as shown in FIG. 3, and illustrates ring gear 74 driving first planet 76 which drives second planet 78. Second planet 78 meshes with, and drives sun gear 80. The use of this compound planet system including first planet 76 and second planet 78 ensures that sun gear 80 and planet carrier 84 rotate in the same direction. Further, torque transmitted from ring gear 74 is split equally between sun gear 80 and planet gear 84. Although three pairs of planet gears 76 and 78 are illustrated, other amounts may be utilized.

Figure 5:
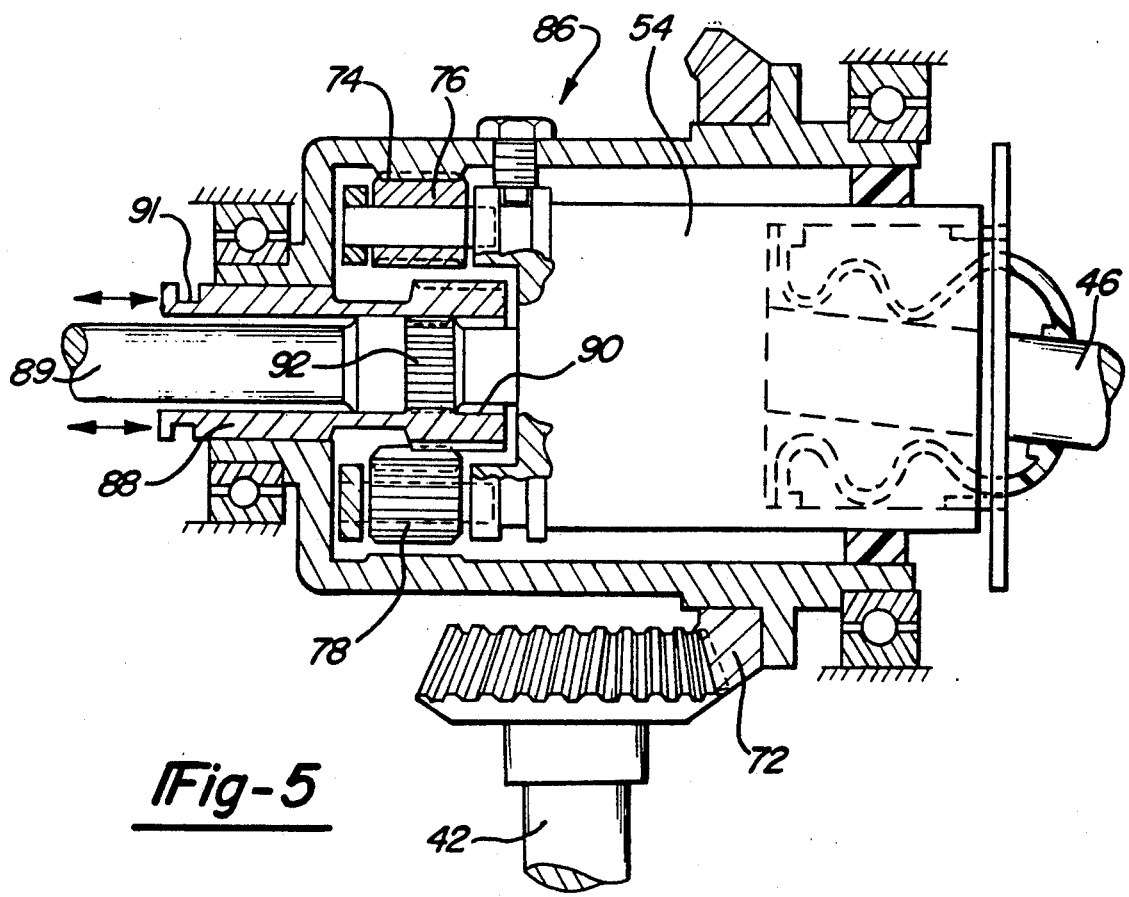
FIG. 5 is a cross-sectional view showing a selectively driven axle system.

FIG. 5 shows a selectively drivable transmission 86 according to the present invention. Transmission 86 is similar to that illustrated in FIG. 3, except that sun gear 88 may be moved laterally to disconnect shaft 89. Sun gear 88 has internal splines 90 over a small lateral extent, and shaft 89 has mating splines 92 over a similar small extent. Transmission 86 is shown with sun gear 88 disconnected from shaft 89. Should sun gear 88 be moved laterally to the left from the position illustrated in this figure, drive would be transmitted between sun gear 88 and shaft 89.

Sun gear 88 is moved to a non-driving position when it is not desired to have the front axle driven. In this situation, transmission member 42, and thus ring gear 74 are preferably non-driven. When sun gear 88 is in the non-driving position, rotation of wheel 26, see FIG. 1, still occurs but does not rotate sun gear 88. Further, rotation of the opposed wheel 28 rotates planet carrier 84, which rotates planet gears 76 and 78. Since sun gear 88 is disconnected from shaft 89, however, sun gear 88 free wheels when driven by the planet gears. Due to the use of the planet system, this disconnect system is relatively simple and efficient. Sun gear 88 slides with its teeth meshing with second planet gears 78. Any means for moving sun gear 88 would come within the scope of this invention. In one example, a vacuum motor may drive a shift fork, which engages collar 91 to move sun gear 88.

Figure 6:
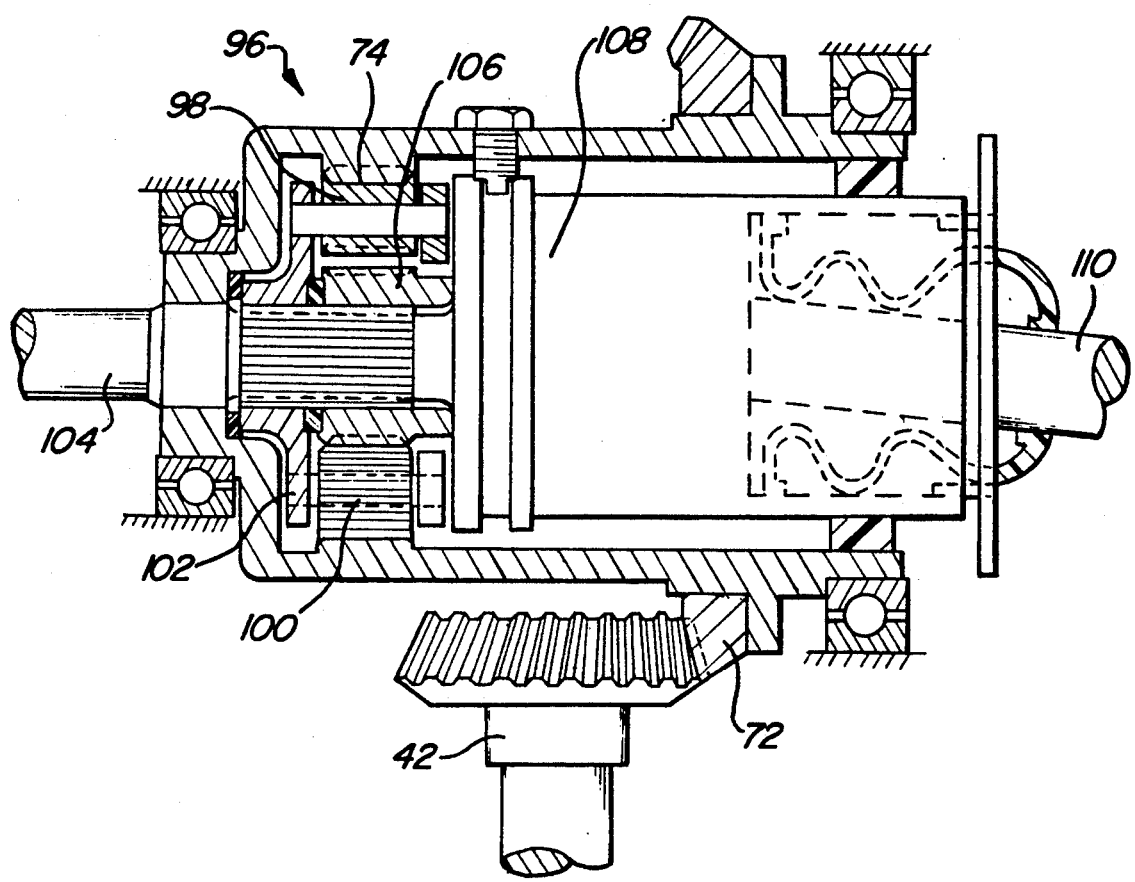
FIG. 6 is a cross-sectional view showing a further embodiment of the axle drive of the present invention.

FIG. 6 shows a further embodiment of the present invention. Ring gear 74 drives first planet gear 98 which in turn drives second planet gear 100. Planet carrier 102 is connected with shaft 104 on the non-offset lateral end. Second planet gear 100 rotates sun gear 106 which drives constant velocity universal joint 108 associated with offset side axle half 110.

Preferred embodiments of the present invention have been disclosed, however, a worker of ordinarily skill in the art would recognize that certain modifications would come within the scope of this invention. For that reason, the following claims should be studied in order to determine the true scope and content of this invention.

I claim:
1. An assembly comprising:
an axle assembly extending along an axis between two lateral ends, a center line being defined as a line extending longitudinally at the lateral center of said axle assembly;
a drive assembly for transmitting rotation to said axle assembly, said drive assembly being spaced laterally from said center line towards a first of said two lateral ends, said axle assembly including first and second axle halves extending to each of said first and second lateral ends, respectively, said drive assembly including a differential case which includes a first drive member which drives a second drive member that drives said first axle half, and a third drive member being drivingly engaged with said first and second drive members, and driving said second axle half, constant velocity universal joints disposed between said first and second axle halves and said second and third drive members, respectively, said constant velocity joints transmitting rotation between said second and third members and said first and second axle halves, respectively, and said constant velocity joint associated with said first axle half being laterally aligned with a portion of said differential case;

said first, second and third drive members making up a planetary gear system with one of said drive members being a sun gear, one being a planet gear set and carrier, and one being a ring gear, said sun gear, said planet gear set and carrier, and said ring gear being arranged such that a single plane defined perpendicular to said axis may pass through a portion of said sun gear, said planet gear set and carrier and said ring gear such that the axial length of said planetary gear system is reduced, to allow an increase in the length of said first axle half, said first member is the ring gear, which drives the planet gear set and carrier, which in turn drives the sun gear, the planetary gear system being such that one-half of the torque delivered to the planetary gear system is directed into said first axle half, and the other half is directed into said second axle half;

said ring gear constitutes a part of said differential case, and said differential case having a bevel gear at a location laterally spaced from said ring gear for meshing with a drive shaft and driving said bevel gear, said bevel gear being at least partially laterally aligned with said constant velocity joint of said first axle half; and said sun gear may be selectively disengaged form its axle half, said sun gear being received on said second axle half, and having teeth in engagement with mating teeth on said planet gears, said sun gear being slidable between an engaged position where it transmits rotation from said planet gears to said second axle half, and a disengaged position where it does not transmit rotation, said teeth of said sun gear sliding on said teeth of said planet gear as said sun gear slides between said engaged and disengaged positions.

2. An assembly as recited in claim 1, wherein said sun gear is said third member, and said planet carrier is said second member.

3. An assembly as recited in claim 2, wherein said second member includes a compound planet system, with plural paris of planet gears, each of said pairs having a first planet gear meshing with said ring gear, and a second planet gear meshing with both said first planet gear and said sun gear such that said first and second axle halves are rotated in the same direction.

4. An assembly as recited in claim 1, wherein said sun gear is said second member and said planet carrier is said third member.

5. An assembly as recited in claim 1, wherein said second drive member includes a compound planet system, with plural pairs of planet gears, each of said pairs having a first planet gear meshing with said ring gear, and a second planet gear meshing with both said first planet gear and said sun gear such that said first and second axle halves are rotated in the same direction.

6. An assembly as recited in claim 1, wherein said axle assembly is the front axle for a vehicle.

7. An assembly as recited in claim 1, wherein said sun gear has an aperture which receives and second axle half, splines extending radially inwardly of said aperture, and said second axle half has mating splines extending radially outwardly to be selectively engaged with said splines on said sun gear when said sun gear is in said engaged position.

8. A transmission comprising:
a ring gear operable to transmit rotation to a planet gear set through a gear tooth connection, said planet gear set being connected to drive a first shaft, said planet gear set having at least one planet gear engaging a sun gear, said sun gear being selectively connected to drive a second shaft; and
said sun gear being movable between an engaged and an disengaged position to selectively transmit rotation form said planet gear to said second shaft, teeth on said sun gear sliding along mating teeth on said planet gear when said sun gear moves between said engaged and disengaged positions.

9. A transmission as recited in claim 8, wherein said sun gear has a central aperture which receives said second shaft, and splines extending radially inwardly from an inner peripheral surface of said aperture, said splines selectively engaging splines extending radially outwardly from said second shaft when aid sun gear is in said engaged position to transmit rotation, and wherein said splines on said sun gear are not engaged with said splines on said planet gear when said sun gear is in said disengaged position, such that rotation is not transmitted.

10. A transmission as recited in claim 8, wherein said planet gear set is fixed to drive sad first shaft.

* * * * *